(12) United States Patent
Cho et al.

(10) Patent No.: US 9,136,556 B2
(45) Date of Patent: Sep. 15, 2015

(54) ELECTRODE ASSEMBLY OF NOVEL STRUCTURE AND PROCESS FOR PREPARATION OF THE SAME

(75) Inventors: Jihoon Cho, Daejeon (KR); Dongmyung Kim, Daejeon (KR); Kiwoong Kim, Daejeon (KR); Sung-Min Hwang, Cheongju-si (KR); Hyun-Chul Jung, Daejeon (KR); Sungjin Kwon, Daejeon (KR); Hyeong Kim, Daegu (KR); Ki Hong Min, Gwacheon-si (KR)

(73) Assignee: LG Chem, Ltd., Seoul (KR)

( * ) Notice: Subject to any disclaimer, the term of this patent is extended or adjusted under 35 U.S.C. 154(b) by 254 days.

(21) Appl. No.: 13/582,250

(22) PCT Filed: Mar. 31, 2011

(86) PCT No.: PCT/KR2011/002214
§ 371 (c)(1),
(2), (4) Date: Feb. 21, 2013

(87) PCT Pub. No.: WO2011/122868
PCT Pub. Date: Oct. 6, 2011

(65) Prior Publication Data
US 2013/0143088 A1 Jun. 6, 2013

(30) Foreign Application Priority Data
Apr. 1, 2010 (KR) .......... 10-2010-0029828

(51) Int. Cl.
*H01M 10/04* (2006.01)
*H01M 2/16* (2006.01)
(Continued)

(52) U.S. Cl.
CPC ........ *H01M 10/0431* (2013.01); *H01M 2/1653* (2013.01); *H01M 2/1686* (2013.01); *H01M 2/18* (2013.01); *H01M 10/0436* (2013.01); *H01M 10/058* (2013.01); *H01M 10/0525* (2013.01);
(Continued)

(58) Field of Classification Search
CPC ...................................... H01M 10/04
USPC .............................. 429/94, 185, 162, 163, 177
See application file for complete search history.

(56) References Cited

U.S. PATENT DOCUMENTS

2003/0224242 A1* 12/2003 Kaito et al. ............... 429/94
2007/0264535 A1* 11/2007 Lee et al. ................. 429/7
(Continued)

FOREIGN PATENT DOCUMENTS

| CN | 101897058 B | 1/2014 |
| EP | 1 065 743 A2 | 1/2001 |

(Continued)

OTHER PUBLICATIONS

KR 10-20090008075 MT.*
(Continued)

*Primary Examiner* — Patrick Ryan
*Assistant Examiner* — Alex Usyatinsky
(74) *Attorney, Agent, or Firm* — Birch, Stewart, Kolasch & Birch, LLP

(57) ABSTRACT

Disclosed herein is an electrode assembly of a cathode/separator/anode structure, wherein a plurality of first unit electrodes and a second electrode sheet are wound so that the first unit electrodes are opposite to the second electrode sheet via a separator sheet, and a first electrode and a second electrode have opposite polarities.

18 Claims, 8 Drawing Sheets

(51) Int. Cl.
  *H01M 2/18* (2006.01)
  *H01M 10/0525* (2010.01)
  *H01M 10/058* (2010.01)
  *H01M 2/02* (2006.01)
  *H01M 2/34* (2006.01)

(52) U.S. Cl.
  CPC ............. *H01M 2/021* (2013.01); *H01M 2/0212* (2013.01); *H01M 2/34* (2013.01); *Y02E 60/122* (2013.01); *Y10T 29/49204* (2015.01)

(56) References Cited

U.S. PATENT DOCUMENTS

| | | |
|---|---|---|
| 2010/0075219 A1 | 3/2010 | Iwaya et al. |
| 2011/0052964 A1 | 3/2011 | Kim et al. |

FOREIGN PATENT DOCUMENTS

| | | |
|---|---|---|
| JP | 9-307127 A | 11/1997 |
| JP | 2001-35484 A | 2/2001 |
| JP | 2002-252036 A | 9/2002 |
| JP | 2005-339330 A | 12/2005 |
| KR | 10-2001-0082058 A | 8/2001 |
| KR | 10-2001-0082059 A | 8/2001 |
| KR | 10-2001-0082060 A | 8/2001 |
| KR | 2003-0023820 A | 3/2003 |
| KR | 10-0859996 A | 9/2008 |
| KR | 10-2009-0008075 A | 1/2009 |
| KR | 10-2009-0064021 A | 6/2009 |
| KR | 10-2010-0016708 A | 2/2010 |
| TW | 200727522 | 7/2007 |
| WO | 94/07276 A1 | 3/1994 |
| WO | 99/31751 A1 | 6/1999 |
| WO | WO 2008/099508 A1 | 8/2008 |
| WO | WO 2009/078632 A2 | 6/2009 |

OTHER PUBLICATIONS

1020090008075KRA.Trans.*

International Search Report issued in PCT/KR2011/002214, mailed on Dec. 27, 2011.

* cited by examiner

ELECTRODE ASSEMBLY OF NOVEL STRUCTURE AND PROCESS FOR PREPARATION OF THE SAME

TECHNICAL FIELD

The present invention relates to an electrode assembly of a novel structure and a process for preparation of the same, and, more particularly, to an electrode assembly of a cathode/separator/anode structure, wherein a plurality of first unit electrodes and a second electrode sheet are wound so that the first unit electrodes are opposite to the second electrode sheet via a separator sheet, and a first electrode and a second electrode have opposite polarities and a process for preparation of the same.

BACKGROUND ART

As mobile devices have been increasingly developed, and the demand for such mobile devices has increased, the demand for secondary batteries has also sharply increased as an energy source for the mobile devices. Accordingly, much research on secondary batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, exhibiting high energy density, discharge voltage and power stability, is very high.

On the other hand, secondary batteries may be classified based on the construction of an electrode assembly having a cathode/separator/anode structure. For example, the electrode assembly may be configured to have a jelly-roll (winding) type structure in which long-sheet type cathodes and long-sheet type anodes are wound in a state in which separators are disposed respectively between the cathodes and the anodes or in a stack type structure in which pluralities of cathodes and anodes having a predetermined size are successively stacked in a state in which separators are disposed respectively between the cathodes and the anodes.

However, such conventional electrode assemblies have the following several problems.

First, the jelly-roll type electrode assembly is prepared by densely winding the long-sheet type cathodes and the long-sheet type anodes with the result that the jelly-roll type electrode assembly is circular or elliptical in section. Consequently, stress, caused by expansion and contraction of the electrodes during charge and discharge of a battery, may accumulate in the electrode assembly, and, when the stress accumulation exceeds a specific limit, the electrode assembly may be deformed. The deformation of the electrode assembly results in non-uniform gap between the electrodes. As a result, the performance of the battery may be abruptly deteriorated, and the safety of the battery may not be secured due to an internal short circuit of the battery. In addition, it is difficult to rapidly wind the long-sheet type cathodes and the long-sheet type anodes while uniformly maintaining the gap between the cathodes and anodes with the result that productivity is lowered.

Secondly, the stack type electrode assembly is prepared by sequentially stacking the plurality of unit cathodes and the plurality of unit anodes. As a result, it is additionally necessary to provide a process for transferring electrode plates, which are used to prepare the unit cathodes and the unit anodes. In addition, much time and effort are required to perform the sequential stacking process with the result that productivity is lowered.

In order to solve the above-mentioned problems, there has been developed a stack/folding type electrode assembly, which is a combination of the jelly-roll type electrode assembly and the stack type electrode assembly. The stack/folding type electrode assembly is configured to have a structure in which pluralities of cathodes and anodes having a predetermined size are stacked, in a state in which separators are disposed respectively between the cathodes and the anodes, so as to constitute a bi-cell or a full cell, and then a plurality of bi-cells or a plurality of full cells are wound in a state in which the bi-cells or the full cells are located on a long separator sheet. The details of the stack/folding type electrode assembly are disclosed in Korean Patent Application Publication No. 2001-0082058, No. 2001-0082059 and No. 2001-0082060, which have been filed in the name of the applicant of the present patent application.

FIGS. 1 and 2 typically illustrate an exemplary process for preparing a conventional stack/folding type electrode assembly.

Referring to these drawings, the stack/folding type electrode assembly is prepared, for example, by arranging bi-cells 10, 11, 12, 13 and 14 on a long separator sheet 20 and sequentially winding the bi-cells 10, 11, 12, 13 and 14 from one end 21 of the separator sheet 20.

A stack/folding type electrode assembly of FIG. 3, which is prepared using the above method, solves problems caused by the jelly-roll type electrode assembly and the stack type electrode assembly. When the stack/folding type electrode assembly is mounted in a battery case so as to prepare a secondary battery, however, the stack/folding type electrode assembly exhibits low safety. For example, when external impact is applied to the secondary battery, the electrode assembly may be pushed with the result that an internal short circuit may occur between cathode tabs 31 and a battery body or between anode tabs 32 and the battery body.

That is, when a certain object presses the battery due to external force, the cathode tabs 31 or the anode tabs 32 come into contact with an opposite electrode of the battery body with the result that a short circuit may occur. Electrode active materials react due to such a short circuit with the result that the temperature of the electrode active materials increases. Also, in a case in which a cathode active material is made of a lithium transition metal oxide exhibiting low electric conductivity, a large amount of heat is generated from the cathode active material due to such a short circuit with the result that combustion or explosion of the battery is further accelerated.

In addition, some of the anode tabs 32 may be cut during an anode V-forming process for welding the anode tabs 32 to an anode lead 33.

Consequently, there is a high necessity for an electrode assembly that can be prepared using a simple preparation process and secure a lifespan and safety of a secondary battery even when external force is applied to the secondary battery.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, when an electrode assembly is configured to have a structure in which a plurality of first unit electrodes and a second electrode sheet are wound so that the first unit electrodes are opposite to the second electrode sheet via a separator sheet, and a first electrode and a second electrode have opposite polarities, it is possible to prevent generation of heat from a battery due to the occurrence of a short circuit between first electrode tabs and second electrode tabs caused by external force, thereby improving safety of the battery, and it is not necessary to perform a process for welding the second electrode tabs to a second electrode lead during preparation of the battery, thereby greatly improving productivity. The present invention has been completed based on these findings.

Technical Solution

In accordance with one aspect of the present invention, the above and other objects can be accomplished by the provision of an electrode assembly of a cathode/separator/anode structure, wherein a plurality of first unit electrodes and a second electrode sheet are wound so that the first unit electrodes are opposite to the second electrode sheet via a separator sheet, and a first electrode and a second electrode have opposite polarities.

According to the present invention, the first electrode and the second electrode have opposite polarities, and the first unit electrodes and the second electrode sheet are wound so that the first unit electrodes are opposite to the second electrode sheet via the separator sheet. Consequently, it is possible to prevent combustion or explosion of a battery, which may be caused by an internal short circuit due to contact between electrode tabs upon falling or vibration of the battery, thereby improving safety of the battery.

Specifically, the second electrode is formed of a single sheet with the result that the second electrode does not include a plurality of second electrode tabs. Consequently, it is possible to fundamentally prevent the electrode tabs from contacting the opposite electrode.

Also, it is not necessary to perform a process for thermally welding the second electrode tabs to an electrode lead, and therefore, it is possible to eliminate a possibility of some of the second electrode tabs being cut during thermal welding of the second electrode tabs to the electrode lead.

In addition, it is not necessary to perform a process for forming tabs at the second electrode or attaching tabs to the second electrode to prepare the unit electrodes, and therefore, it is possible to reduce the number of battery preparation processes, thereby improving productivity.

In a preferred example, the electrode assembly may be configured to have a structure in which, in a state in which the first unit electrodes and the second electrode sheet, between which a first separator sheet is disposed, are placed on a second separator sheet, the first unit electrodes, the second electrode sheet, the first separator sheet and the second separator sheet are sequentially wound by a width of each of the first unit electrodes in a longitudinal direction (a lengthwise direction) of the separator sheets.

Specifically, the electrode assembly may be configured to have a structure in which, in a state in which the second electrode sheet, the first separator sheet and the first unit electrodes are sequentially placed on the second separator sheet upward, the second electrode sheet, the first separator sheet, the first unit electrodes and the second separator sheet are sequentially wound by the width of each of the first unit electrodes in the longitudinal direction (the lengthwise direction) of the sheets.

On the other hand, the electrode assembly may be configured to have a structure in which, in a state in which the first unit electrodes, the first separator sheet and the second electrode sheet are sequentially placed on the second separator sheet upward, first unit electrodes, the first separator sheet, the second electrode sheet and the second separator sheet are sequentially wound by the width of each of the first unit electrodes in the longitudinal direction (the lengthwise direction) of the sheets.

The first electrode may be a cathode and the second electrode may be an anode. On the other hand, the first electrode may be an anode and the second electrode may be a cathode.

Meanwhile, the first unit electrodes may be an electrode prepared by coating opposite major surfaces of a current collector of the first electrode with a first electrode active material, and the second electrode sheet may be an electrode prepared by coating the opposite major surfaces of the current collector of the first electrode with a second electrode active material.

For example, in a case in which the first electrode is a cathode and the second electrode is an anode, the cathode is prepared by applying, drying, and pressing a mixture of a cathode active material, a conductive agent and a binder to opposite major surfaces of a cathode current collector. A filler may be added to the mixture as needed.

Generally, the cathode current collector has a thickness of 3 to 500 µm. The cathode current collector is not particularly restricted so long as the cathode current collector exhibits high conductivity while the cathode current collector does not induce any chemical change in the battery to which it is applied. For example, the cathode current collector may be made of stainless steel, aluminum, nickel, titanium or plastic carbon. Alternatively, the cathode current collector may be made of aluminum or stainless steel the surface of which is treated with carbon, nickel, titanium or silver. The cathode current collector may have micro concave and convex parts formed at the surface thereof so as to increase the attaching force of the cathode active material. The cathode current collector may be configured in various forms, such as a film, a sheet, a foil, a net, a porous body, a foam body and a non-woven fabric body.

In case of a lithium secondary battery, the cathode active material may be, but is not limited to, a layered compound, such as lithium cobalt oxide ($LiCoO_2$) or lithium nickel oxide ($LiNiO_2$), or a compound replaced by one or more transition metals; lithium manganese oxide represented by a chemical formula $Li_{1+x}Mn_{2-x}O_4$ (where, x=0 to 0.33) or lithium manganese oxide, such as $LiMnO_3$, $LiMn_2O_3$ or $LiMnO_2$; lithium copper oxide ($Li_2CuO_2$); vanadium oxide, such as $LiV_3O_8$, $LiFe_3O_4$, $V_2O_5$ or $Cu_2V_2O_7$; Ni-sited lithium nickel oxide represented by a chemical formula $LiNi_{1-x}M_xO_2$ (where, M=Co, Mn, Al, Cu, Fe, Mg, B or Ga, and x=0.01 to 0.3); lithium manganese composite oxide represented by a chemical formula $LiMn_{2-x}M_xO_2$ (where, M=Co, Ni, Fe, Cr, Zn or Ta, and x=0.01 to 0.1) or a chemical formula $Li_2Mn_3MO_8$ (where, M=Fe, Co, Ni, Cu or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 50 weight % based on the total weight of the compound including the cathode active material. The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black or summer black; conductive fiber, such as carbon fiber or metallic fiber; metallic powder, such as carbon fluoride powder, aluminum powder or nickel powder; conductive whisker, such as zinc oxide and potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 50 weight % based on the total weight of the compound including the cathode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional component used to inhibit expansion of the cathode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

On the other hand, the anode is prepared by applying, drying and pressing an anode active material to an anode current collector. The conductive agent, the binder and the filler, which were previously described, may be selectively added to the anode active material as needed.

Generally, the anode current collector has a thickness of 3 to 500 μm. The anode current collector is not particularly restricted so long as the anode current collector exhibits high conductivity while the anode current collector does not induce chemical changes in the battery to which it is applied. For example, the anode current collector may be made of copper, stainless steel, aluminum, nickel, titanium or plastic carbon. Alternatively, the anode current collector may be made of copper or stainless steel the surface of which is treated with carbon, nickel, titanium or silver or an aluminum-cadmium alloy. In the same manner as in the cathode current collector, the anode current collector may have micro concave and convex parts formed at the surface thereof so as to increase the attaching force of the anode active material. The anode current collector may be configured in various forms, such as a film, a sheet, a foil, a net, a porous body, a foam body and a non-woven fabric body.

As the anode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; metal oxide, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ or $Bi_2O_5$; conductive polymer, such as polyacetylene; or a Li—Co—Ni based material.

The second electrode sheet may be attached to the top of the second separator sheet so that the second electrode sheet and the second separator sheet can be easily wound. The attachment of the second electrode sheet to the top of the second separator sheet may be achieved by, without being limited to, thermal welding.

As a preferred example, electrode tabs may protrude from the respective first unit electrodes, and an electrode lead may be attached to a non-coated portion of a current collector, to which an electrode active material is not applied, of the second electrode sheet.

As another example, the first unit electrodes may be alternately arranged with respect to the second electrode sheet so that electrode tabs are located at the same region in a wound state.

Meanwhile, the wound thickness of the first unit electrodes increases as the first unit electrodes are sequentially wound in the longitudinal direction. Consequently, the first unit electrodes are arranged with respect to the second electrode sheet so that an interval between the first unit electrodes increases in the longitudinal direction.

The first separator sheet and/or the second separator sheet may have a length extended to surround the electrode assembly once after the winding, and the outermost end of the first separator sheet and/or the second separator sheet may be fixed by thermal welding or an adhesive tape. For example, a thermal welding device or a heat plate may be brought into contact with the first separator sheet and/or the second separator sheet to be finished such that the first separator sheet and/or the second separator sheet are welded by heat and then fixed. Consequently, the pressure is continuously maintained, and therefore, stable interface contact between the electrode and the separator sheet is achieved.

The first separator sheet and the second separator sheet may be porous insulative films made of the same material or different materials.

As the first separator sheet and the second separator sheet, for example, an insulative thin film exhibiting high ion permeability and high mechanical strength may be used. The separator sheets generally have a pore diameter of 0.01 to 10 μm and a thickness of 5 to 300 μm. As the material for the separator sheets, for example, sheets or non-woven fabrics made of olefin polymer, such as polypropylene, which exhibits chemical resistance and hydrophobicity, glass fiber, or polyethylene, are used. The first separator sheet and the second separator sheet may be made of one selected from a group consisting of micro porous polyethylene film, polypropylene film, multi-layered film prepared by a combination of the polyethylene film and the polypropylene film, and polymer film for a polymer electrolyte, such as polyvinylidene fluoride, polyethylene oxide, polyacrylonitrile, and polyvinylidene fluoride hexafluoropropylene copolymer.

It is preferable for the separator sheets to have an adhesive function to easily perform a winding process. In a preferred example, the first separator sheet and the second separator sheet may be made of polymer film for a polymer electrolyte, having an adhesive function by thermal welding, which includes a first polymer layer of micro porosity and a second polymer layer obtained by gelling polyvinylidene fluoride chlorotrifluoroethylene copolymer, disclosed in Korean Patent Application No. 1999-57312 filed in the name of the applicant of the present application. The disclosure of the application is incorporated herein by reference.

In accordance with another aspect of the present invention, there is provided an electrochemical cell including the electrode assembly with the above-stated construction.

A typical example of the electrochemical cell may be a secondary battery. Preferably, the secondary battery is a lithium secondary battery having lithium ions as a medium.

Based on the form of an electrode assembly and based on the structure or the form of a battery case, the lithium secondary battery may be classified as a cylindrical battery, a prismatic battery or a pouch-shaped battery. The present invention is preferably applicable to the pouch-shaped battery, which exhibits low safety when external impact is applied to the battery, for example, when the battery is dropped.

The pouch-shaped battery is configured to have a structure in which an electrode assembly is mounted in a pouch-shaped case made of a laminate sheet including a metal layer and a resin layer, as previously described. A case made of an aluminum laminate sheet is normally used.

A method of preparing an electrochemical cell using an electrode assembly is well known in the art to which the present invention pertains, and therefore, a detailed description thereof will not be given.

Meanwhile, in recent years, a lithium ion secondary battery has attracted considerable attention as a power source for large-sized devices as well as small-sized mobile devices. When the lithium ion secondary battery is applied to such applications, it is preferable for the lithium ion secondary battery to have a low weight. An example of a method of reducing the weight of the secondary battery is to configure the secondary battery to have a structure in which an electrode assembly is mounted in a pouch-shaped case made of an aluminum laminate sheet. The lithium secondary battery is well known in the art to which the present invention pertains, and therefore, a description thereof will not be given.

Also, when the secondary battery is used as a power source of the middle or large-sized devices, as previously described, it is preferable for the secondary battery to be configured to have a structure in which the operational performance of the secondary battery is maximally restrained even after long-term use thereof, the life span of the secondary battery is excellent, and the secondary battery can be mass-produced at low cost. In this regard, a secondary battery including the electrode assembly according to the present invention is preferably used in a middle or large-sized battery module including the secondary battery as a unit cell.

The middle or large-sized battery module is configured to have a structure in which a plurality of unit cells is connected in series or series/parallel to each other to provide high power and large capacity. The middle or large-sized battery module is well known in the art to which the present invention pertains, and therefore, a description thereof will not be given.

In accordance with a further aspect of the present invention, there is provided a method of preparing the electrode assembly with the above-stated construction.

In a preferred example, the method of preparing the electrode assembly may include a) cutting a first electrode sheet to prepare a plurality of first unit electrodes configured so that each of the first unit electrodes has an electrode tab formed at one side thereof, b) attaching an electrode lead to a non-coated portion of a current collector, to which an electrode active material is not applied, to prepare a second electrode sheet, c) sequentially winding the second electrode sheet, a first separator sheet, the first unit electrodes and a second separator sheet by a width of each of the first unit electrodes in a longitudinal direction (a lengthwise direction) of the sheets in a state in which the second electrode sheet, the first separator sheet and the first unit electrodes are sequentially placed on the second separator sheet upward, and d) welding the electrode tabs of the first unit electrodes to the electrode lead.

The electrode assembly prepared using the method of preparing the electrode assembly according to the present invention is similar to a jelly-roll type electrode assembly and a stack/folding type electrode assembly since the electrode assembly according to the present invention is based on a wound structure. However, the electrode assembly according to the present invention does not suffer from internal stress accumulation caused in the jelly-roll type electrode assembly and thus deformation of the electrode assembly. On the other hand, the electrode assembly according to the present invention does not suffer from low safety caused in the stack/folding type electrode assembly.

In addition, the electrode assembly prepared using the method of preparing the electrode assembly according to the present invention is similar to a stack type electrode assembly since some of the electrodes are prepared in the form of unit electrodes. However, the electrode assembly according to the present invention does not suffer from complicated preparation and low productivity caused in the stack type electrode assembly.

Therefore, the method of preparing the electrode assembly according to the present invention is a novel technology that is capable of solving all the problems associated with such conventional methods of preparing an electrode assembly.

Effects of the Invention

As is apparent from the above description, the electrode assembly according to the present invention is configured to have a structure in which a plurality of first unit electrodes and a second electrode sheet are wound so that the first unit electrodes are opposite to the second electrode sheet via a separator sheet, and a first electrode and a second electrode have opposite polarities, and therefore, it is possible to prevent the generation of heat from a battery due to the occurrence of an internal short circuit caused by external force, thereby improving safety of the battery, and it is not necessary to perform a process for welding a plurality of second electrode tabs to a second electrode lead during preparation of the battery, thereby greatly improving productivity.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
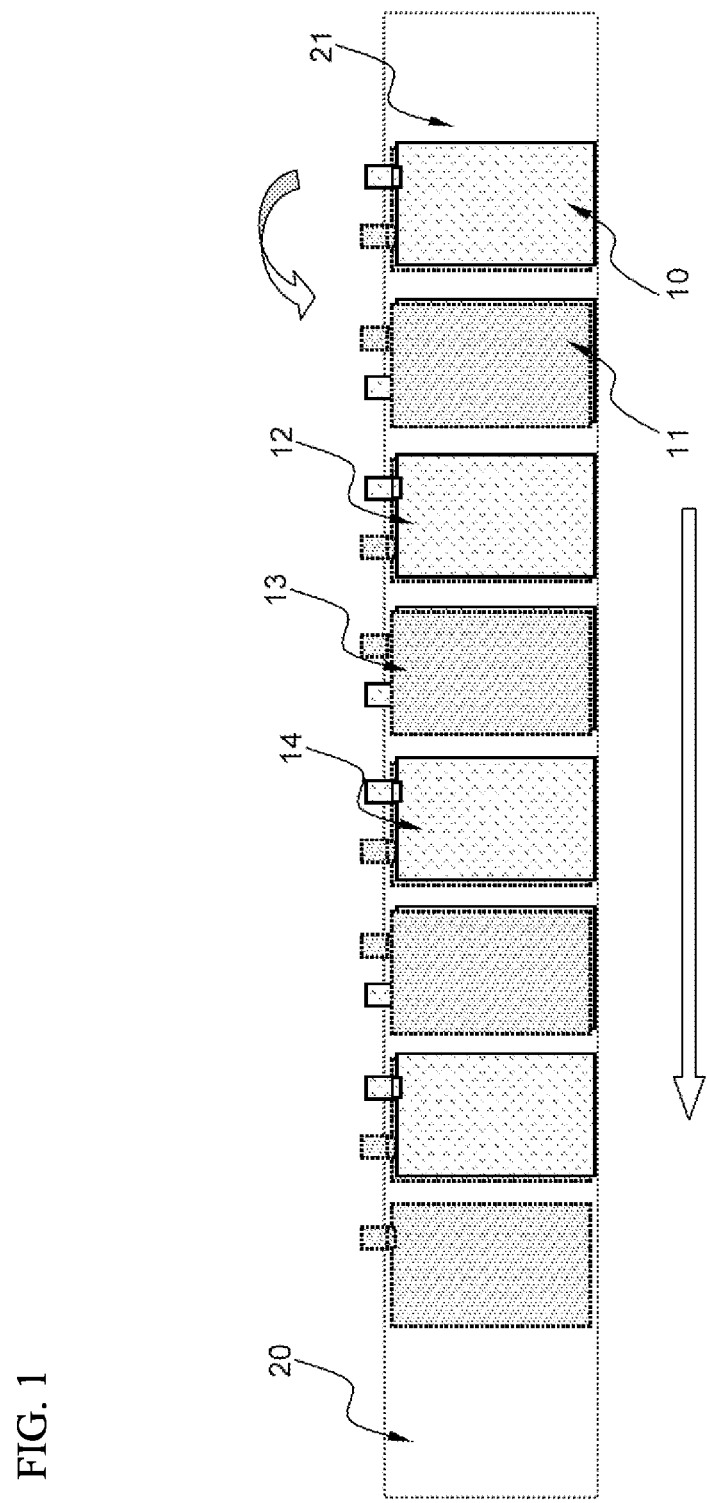
FIG. 1 is a typical view illustrating a process of preparing a stack/folding type electrode assembly including conventional bi-cells.
Figure 2:
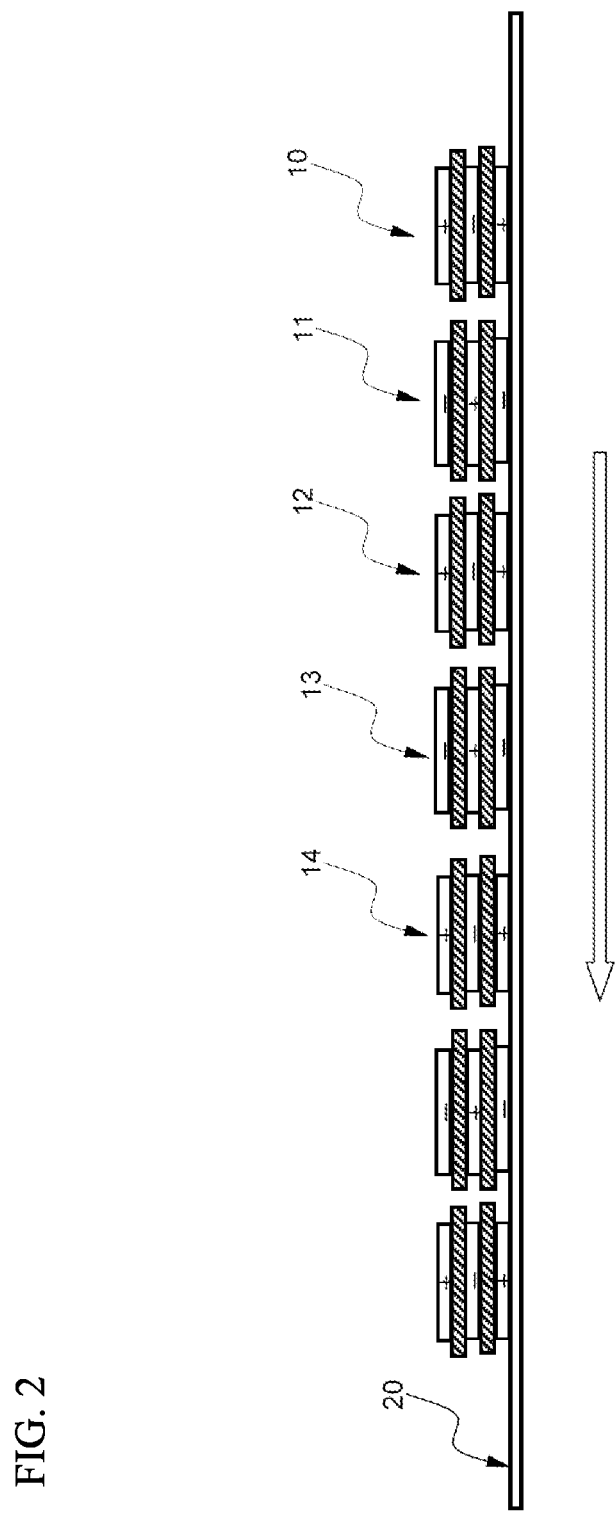
FIG. 2 is a typical view illustrating an array combination of the bi-cells in the process for preparing the stack/folding type electrode assembly of FIG. 1.
Figure 3:
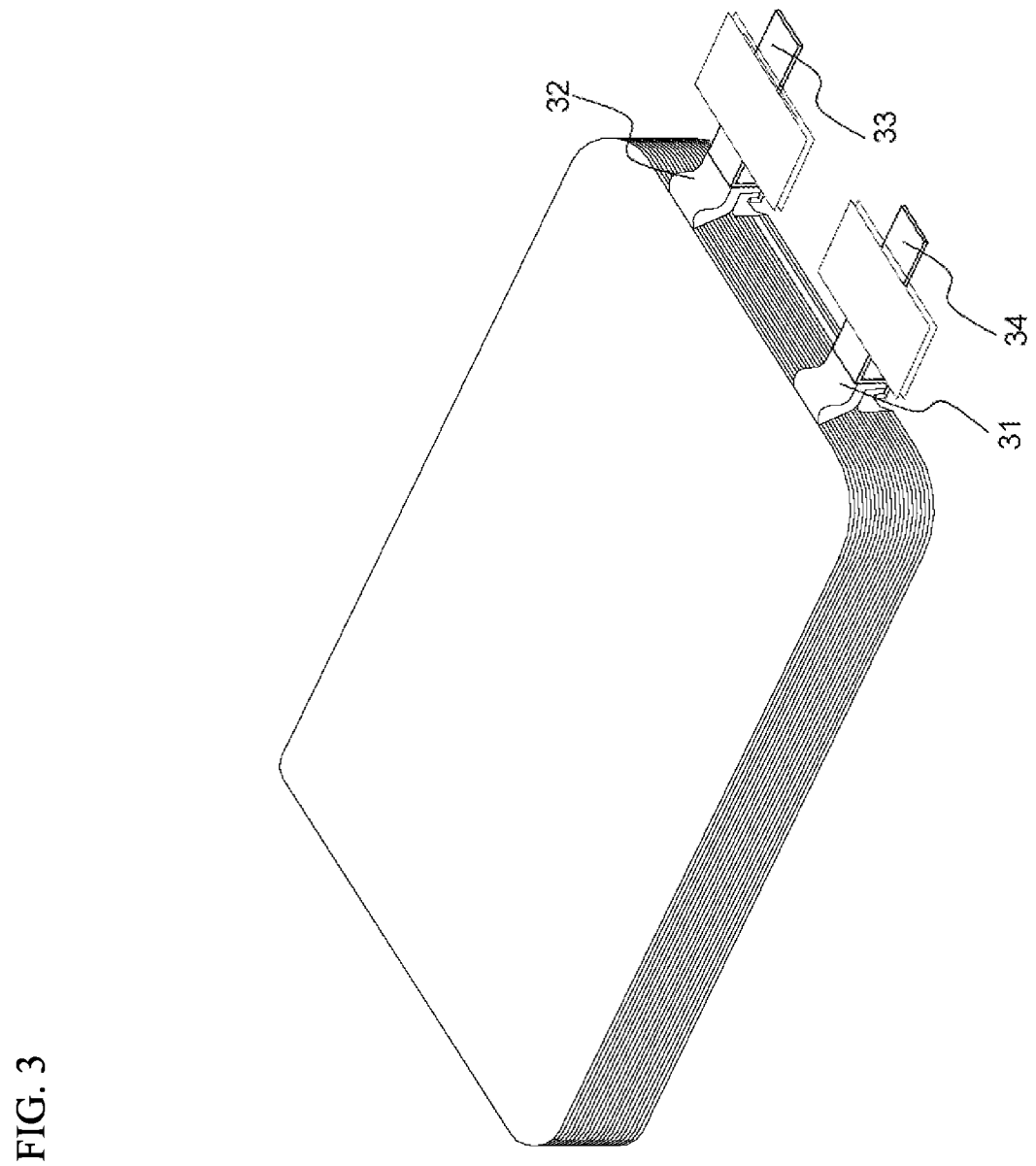
FIG. 3 is a typical view illustrating the structure of an electrode assembly prepared using the process of FIG. 1.
Figure 4:
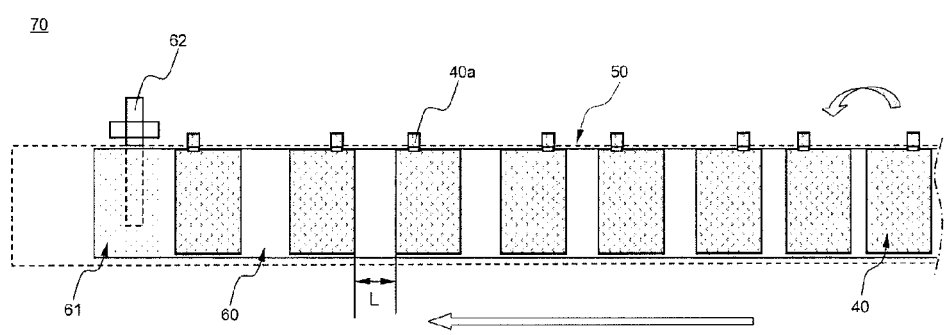
FIG. 4 is a typical view illustrating a process of preparing an electrode assembly according to an embodiment of the present invention.
Figure 5:
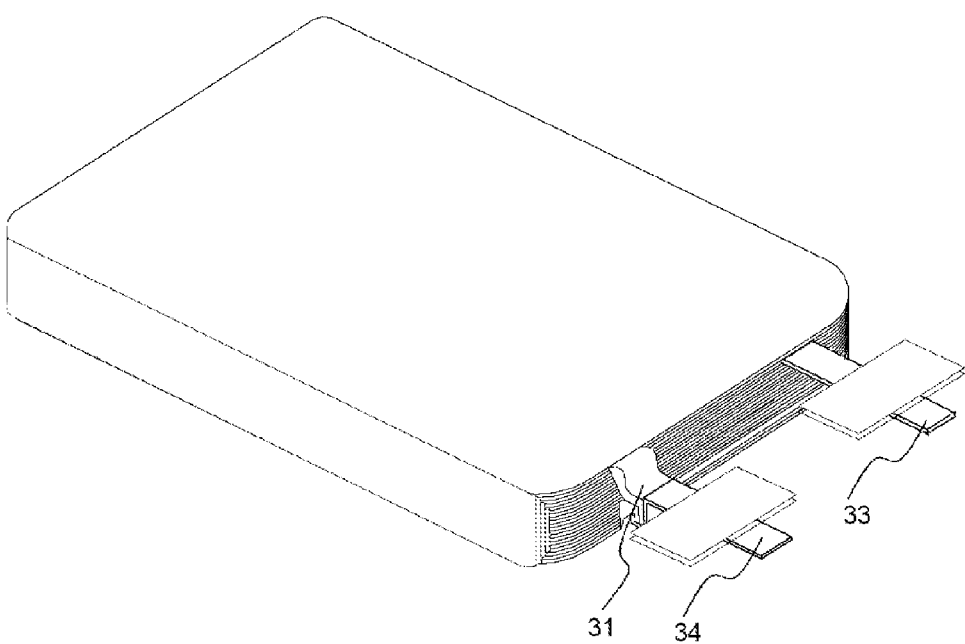
FIG. 5 is a typical view illustrating the structure of an electrode assembly prepared using the process of FIG. 4.

FIG. 4 is a typical view illustrating a process of preparing an electrode assembly according to an embodiment of the present invention, and FIG. 5 is a typical view illustrating the structure of an electrode assembly prepared using the process of FIG. 4.

Referring to these drawings, an electrode assembly 70 is configured in a cathode/separator/anode structure. Eight first unit electrodes 40 and a second electrode sheet 60 are wound so that the first unit electrodes 40 and the second electrode sheet 60 are opposite to each other via a separator sheet 50.

A second electrode lead 62 is attached (welded) to a non-coated portion of a current collector, to which an electrode active material is not applied, of the second electrode sheet 60.

The first unit electrodes 40 are alternately arranged with respect to the second electrode sheet 60 so that first electrode tabs 40a are located at the same region in a wound state. The first unit electrodes 40 are arranged with respect to the second electrode sheet 60 so that the interval L between the first unit electrodes 40 increases in the longitudinal direction (in the direction indicated by an arrow).

The first unit electrodes 40, the second electrode sheet 60 and the separator sheet 50 are wound in a state in which the first unit electrodes 40, the second electrode sheet 60 and the separator sheet 50 are stacked on another separator sheet in a cathode/separator/anode structure to constitute an electrode assembly, which will be described below with reference to FIGS. 7 and 8.

Figure 6:
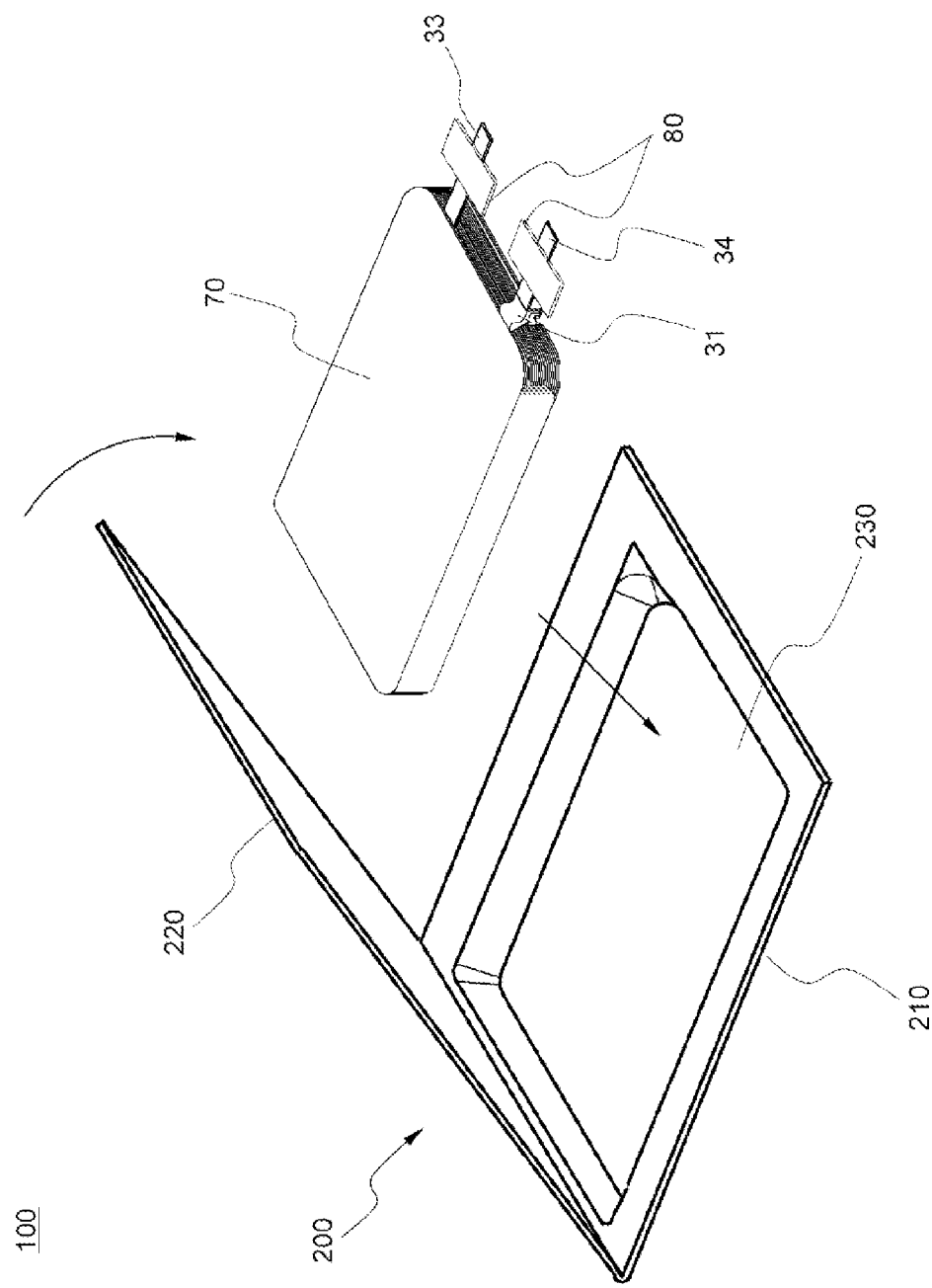
FIG. 6 is a typical view illustrating the structure of a lithium secondary battery including the electrode assembly of FIG. 5.

FIG. 6 is a typical view illustrating the structure of a lithium secondary battery including the electrode assembly of FIG. 5.

Referring to FIG. 6 together with FIG. 5, a lithium secondary battery 100 is configured to have a structure in which an electrode assembly 70 including cathodes, an anode and a separator disposed between the cathodes and the anode in a pouch-shaped battery case 200, cathode tabs 31 of the electrode assembly 70 are welded to a cathode lead 34 by V-forming, an anode lead 33 is welded to a non-coated portion of the anode sheet, and the battery case 200 is sealed in a state in which the cathode lead 34 and the anode lead 33 protrude outward from the battery case 200.

The battery case 200 is made of a soft packing material, such as an aluminum laminate sheet. The battery case 200 includes a case body 210 having a depressed receiving part 230, in which the electrode assembly 70 is located, and a cover 220 one end of which is connected to the case body 210.

Insulative films 80 are attached to the tops and bottoms of the cathode lead 34 and the anode lead 33 to secure electrical insulation and sealability between the cathode lead 34 and the battery case 200 and between the anode lead 33 and the battery case 200.

Figure 7:
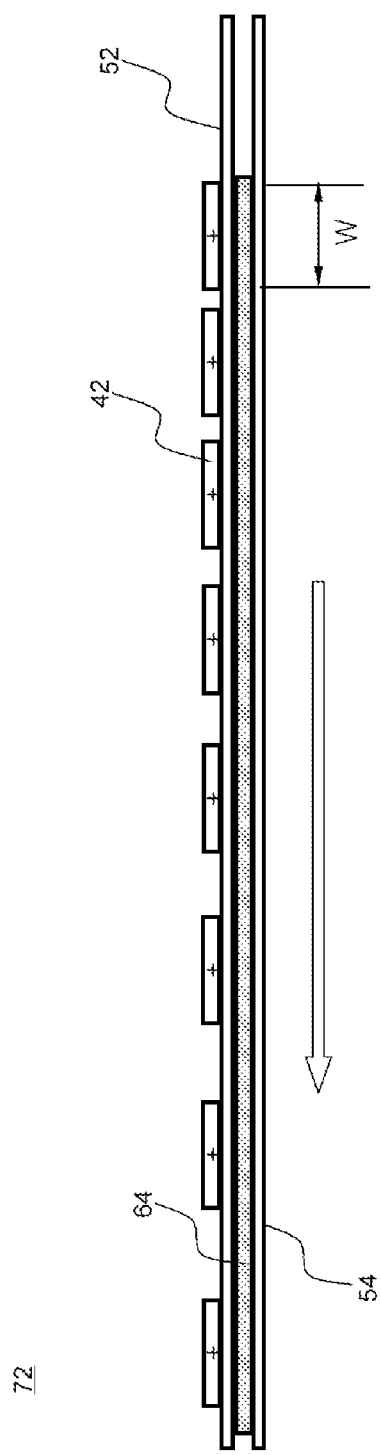
FIGS. 7 and 8 are typical views illustrating exemplary array combinations of first unit electrodes and a second electrode sheet in processes for preparing electrode assemblies according to other embodiments of the present invention.

FIG. 7 is a typical view illustrating an exemplary array combination of first unit electrodes and a second electrode sheet in a process for preparing an electrode assembly according to another embodiment of the present invention.

Referring to FIG. 7, an electrode assembly 72 is configured to have a structure in which, in a state in which unit cathodes 42 and an anode sheet 64, between which a first separator sheet 52 is disposed, are placed on a second separator sheet 54, i.e. in a state in which the anode sheet 64, the first separator sheet 52 and the unit cathodes 42 are sequentially placed on the second separator sheet 54, the unit cathodes 42, the anode sheet 64, the first separator sheet 52 and the second separator sheet 54 are sequentially wound by the width W of each of the unit cathodes 42 in the longitudinal direction (in the direction indicated by an arrow) of the first separator sheet 52 and the second separator sheet 54.

The first separator sheet 52 and the second separator sheet 54 are porous insulative films made of the same material. The anode sheet 64 is attached to the top of the second separator sheet 54 by thermal welding.

Figure 8:
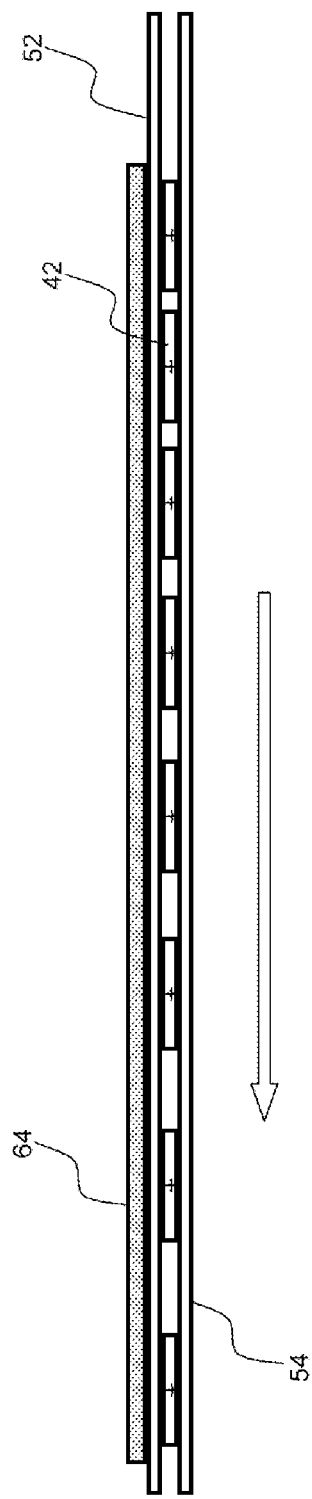

FIG. 8 is a typical view illustrating an exemplary array combination of first unit electrodes and a second electrode sheet in a process for preparing an electrode assembly according to a further embodiment of the present invention.

Referring to FIG. 8, the structure of an electrode assembly 74 is identical to that of the electrode assembly 72 of FIG. 7 except that the electrode assembly 74 is configured to have a structure in which, in a state in which unit cathodes 42, a first separator sheet 52 and an anode sheet 64 are sequentially placed on a second separator sheet 54, the unit cathodes 42, the first separator sheet 52, the anode sheet 64 and the second separator sheet 54 are sequentially wound by the width W of each of the unit cathodes 42 in the longitudinal direction (in the direction indicated by an arrow) of the sheets, and a detailed description thereof will be omitted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrochemical cell, comprising:
a first separator sheet;
a plurality of first unit electrodes on a first side of the first separator sheet;
an electrode tab extending from each first unit electrode;
a second electrode sheet on a second side of the first separator sheet, the second side being opposite the first side;
an electrode lead extending from the second electrode sheet; and
a second separator sheet,
wherein the first separator sheet is wound so that the first unit electrodes are opposite the second electrode sheet via the first separator sheet, and
wherein the plurality of first unit electrodes or second electrode sheet is between the first separator sheet and second separator sheet.

2. The electrode assembly according to claim 1, wherein the electrode assembly is configured to have a structure in which, in a state in which the first unit electrodes and the second electrode sheet, between which the first separator sheet is disposed, are placed on the second separator sheet, the first unit electrodes, the second electrode sheet, the first separator sheet and the second separator sheet are sequentially wound by a width of each of the first unit electrodes in a longitudinal direction (a lengthwise direction) of the separator sheets.

3. The electrode assembly according to claim 2, wherein the electrode assembly is configured to have a structure in which, in a state in which the second electrode sheet, the first separator sheet and the first unit electrodes are sequentially placed on the second separator sheet upward, the second electrode sheet, the first separator sheet, the first unit electrodes and the second separator sheet are sequentially wound by the width of each of the first unit electrodes in the longitudinal direction (the lengthwise direction) of the sheets.

4. The electrode assembly according to claim 2, wherein the electrode assembly is configured to have a structure in which, in a state in which the first unit electrodes, the first separator sheet and the second electrode sheet are sequentially placed on the second separator sheet upward, the first unit electrodes, the first separator sheet, the second electrode sheet and the second separator sheet are sequentially wound by the width of each of the first unit electrodes in the longitudinal direction (the lengthwise direction) of the sheets.

5. The electrode assembly according to claim 1, wherein the first electrode is a cathode and the second electrode is an anode.

6. The electrode assembly according to claim 1, wherein the first electrode is an anode and the second electrode is a cathode.

7. The electrode assembly according to claim 1, wherein the first unit electrodes are prepared by coating opposite major surfaces of a current collector of the first electrode with a first electrode active material, and
    wherein the second electrode sheet is prepared by coating the opposite major surfaces of the current collector of the second electrode with a second electrode active material.

8. The electrode assembly according to claim 1, wherein the second electrode sheet is attached to the top of the second separator sheet by thermal welding.

9. The electrode assembly according to claim 1, wherein the first unit electrodes are alternately arranged with respect to the second electrode sheet so that the electrode tabs are located at the same region in a wound state.

10. The electrode assembly according to claim 1, wherein the first unit electrodes are arranged with respect to the second electrode sheet so that an interval between the first unit electrodes increases in a longitudinal direction.

11. The electrode assembly according to claim 2, wherein an outermost end of the wound first separator sheet, the second separator sheet or the first separator sheet and the second separator sheet are fixed by thermal welding or an adhesive tape.

12. The electrode assembly according to claim 2, wherein the first separator sheet and the second separator sheet are porous insulative films made of the same material or different materials.

13. The electrode assembly according to claim 2, wherein the first separator sheet and the second separator sheet are made of one selected from a group consisting of micro porous polyethylene film, polypropylene film, multi-layered film prepared by a combination of the polyethylene film and the polypropylene film, and polymer film for a polymer electrolyte, such as polyvinylidene fluoride, polyethylene oxide, polyacrylonitrile, and polyvinylidene fluoride hexafluoropropylene copolymer.

14. An electrochemical cell comprising an electrode assembly according to claim 1.

15. The electrochemical cell according to claim 14, wherein the electrochemical cell is a secondary battery.

16. The electrochemical cell according to claim 15, wherein the secondary battery is a lithium secondary battery having lithium ions.

17. The electrochemical cell according to claim 15, wherein the secondary battery is configured to have a structure in which the electrode assembly is mounted in a pouch-shaped case made of a laminate sheet comprising a metal layer and a resin layer.

18. A method of preparing an electrode assembly according to claim 1, comprising:
    a) cutting a first electrode sheet to prepare a plurality of first unit electrodes configured so that each of the first unit electrodes has an electrode tab formed at one side thereof;
    b) attaching an electrode lead to a non-coated portion of a current collector, to which an electrode active material is not applied, to prepare a second electrode sheet;
    c) sequentially winding the second electrode sheet, a first separator sheet, the first unit electrodes and a second separator sheet by a width of each of the first unit electrodes in a longitudinal direction (a lengthwise direction) of the sheets in a state in which the second electrode sheet, the first separator sheet and the first unit electrodes are sequentially placed on the second separator sheet upward; and
    d) welding the electrode tabs of the first unit electrodes to the electrode lead.

\* \* \* \* \*